Nov. 23, 1943.           P. D. NEWTON           2,334,948
                        FUEL TANK CLOSURE
                       Filed March 27, 1941

INVENTOR.
Paul D. Newton
BY
John F. Stark

Patented Nov. 23, 1943

2,334,948

UNITED STATES PATENT OFFICE 2,334,948

FUEL TANK CLOSURE

Paul D. Newton, Mayfield Heights, Ohio, assignor to Eaton Manufacturing Company, Cleveland, Ohio, a corporation of Ohio Application March 27, 1941, Serial No. 385,401

2 Claims. (Cl. 220—44)

This invention relates to tank closures in general, and, more particularly, concerns a valved closure for fuel storage tanks on trucks, tractors and the like.

It is well known to have valved closures for radiators and/or fuel tanks, generally, to prevent loss of the contents thereof through boiling, in the case of radiators, or through vaporization in the case of vehicle fuel tanks. Closures with a valve to prevent loss of contents as in the above instance are usually referred to as pressure closures or closures with a pressure relief valve. It is equally essential in closures on such systems that the tank be provided with a vent or small aperture, preferably located in the filler cap, to permit the entrance of air to replace liquid withdrawn from the tank. In the case of a fuel tank as here involved this aperture, although small in size, results in the loss of considerable fuel by vaporization. Furthermore, when the tank is full or partly full, more or less fuel escapes through the opening by splashing when the vehicle is in motion. This condition is especially true in military convoy trucks, reconnaisance cars and tractors which frequently maneuver under operating conditions on very uneven rocky terrain or steep hillsides, where the condition is greatly aggravated, and, for which purpose the closures of the present invention were designed and have been accepted.

In addition to the mere loss of fuel above described there is also attached considerable fire hazard. Fuel spilled on the exterior of the vehicle presents a constant danger of fire, especially in the event of an accident, if the vehicle is overturned, spreading of gasoline should be avoided. Accordingly, an object of the present invention is to provide a closure means whereby the fuel tank is normally sealed to provide a predetermined pressure and vacuum relief, although permitting the entrance of air to compensate for withdrawal of fuel.

A further object of the invention is the provision of a novel closure means formed of a sheet metal stamping of such conformation as to receive and retain therein other sheet metal stampings and component parts which when assembled in proper relationship provide a complete valved closure for a tank affording both pressure and vacuum release to the contents thereof; the provision in a valved closure as above described of an improved construction and more economical arrangement of parts suitable for large commercial manufacture; the provision in a valved tank closure as above described wherein the valved operating parts, housed within a chamber formed by an outer closure member and an inner valve retaining casing positioned therein, are protected from dirt or accumulation of other foreign matter and damage from dropping or being roughly handled in service use.

Further and other objects and advantages of the invention about to be described reside in the novel combination and arrangement of parts, when considered in conjunction with the accompanying drawing forming a part of this specification, and will be pointed out with particularity in the appended claims.

In the drawing like reference characters refer to corresponding parts in the several views and in which.

Figure 1:
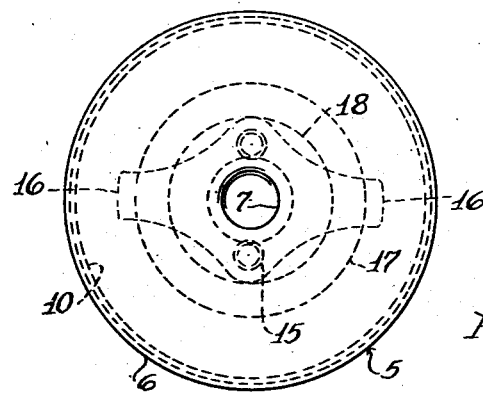
Fig. 1 is a top plan view of a valved tank closure according to the teaching of this invention.
Figure 2:
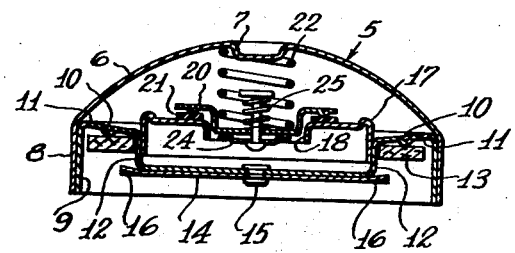
Fig. 2 is a vertical sectional view through the closure of Fig. 1 revealing the valve structure housed therein.

Now having reference to the drawing, in Fig. 1 and Fig. 2 there is shown a tank closure generally designated by the numeral 5, comprised of an outer circular shell 6. The outer shell 6 is shown as a domed top with a central depression 7 providing a spring seat and a lower depending skirt portion 8, and may be drawn from sheet metal of suitable gage in a well known manner. Retained in fixed position by the skirt portion 8 of the closure is a cup-shaped inner member 9 having a reverse bent outer skirt portion press-fitted into the skirt 8 and which with the overlying dome of the outer closure 6 defines a valve chamber. The cup shaped inner member 9 has a plurality of small projections 10 punched from a lateral wall thereof to properly seat and position an annular gasket 13 which cooperates with the outer rim of the tank neck, not shown. Small vent openings 11 and 12 provide for pressure flow from the domed chamber between the outer closure 6 and inner member 9 and from the space above the tank to the valve chamber, respectively. A spring metal member 14 is riveted, as at 15, or secured by equivalent means, centrally to the lower wall of the cup-shaped member 9 and has diametrically opposed locking fingers 16 for engagement with inside locking flanges or cams on the filler tank neck (not shown). It will be apparent that the inner cup member 9 may be readily stamped or drawn from a selected gage metal, and the spring metal member 14 may be punched out, making both elements very economical to manufacture.

In the upstanding cup-shaped portion of the inner member 9 an inverted valve casing 17 is press-fitted therein which has a central axial opening 18 for reception of a valve member 20, resting upon an annular sealing gasket 21 supported by the bottom casing wall. The valve 20 which opens outwardly is known as a pressure relief valve and is seated with a predetermined pressure by coil spring 22 having one end fixed by spring seat 7 and the other end centered in the central portion of the valve in axial alignment therewith. The pressure valve 20 just referred to has a central aperture therethrough within the regions of coil spring 22 for reception of a spring-pressed stud 25 having a valve 24 upon the lower end thereof seated upon the lower face of the pressure valve and opening in the opposite direction under vacuum pressure induced by withdrawal of fluid contents from the tank.

The operation of the tank closure is as follows: The cap is applied and fixed to the tank by the locking fingers 16 and seals the same by means of the gasket 13. Excess pressure conditions in the tank caused by vaporization or fluid expansion may pass through the vent openings 12 to the underside of pressure relief valve 20 and at any predetermined value will unseat the valve and transfer the pressure fluid to the space beneath the domed closure 6 where fluid pressure will be vented to the atmosphere around the gasket 13 by means of the vent 11. Under a condition of negative pressure or vacuum in the tank, as when the contents are being withdrawn, the reverse flow of fluid (air) may be effected by means of the inwardly opening vacuum valve 24. Under either condition, of course, the valves 20 and 24 automatically return to their seats upon the pressure condition being relieved or balanced; preferably the vacuum valve spring is much lighter than the coiled pressure valve spring to suit the operating conditions encountered. The value and advantages of such a compact novel structure will now be apparent such as economy of manufacture, protection of the valve parts from fluid contact and contamination by dirt or other foreign matter. Additionally a very important consideration is the protection afforded the valve parts and casing from damage in dropping or rough handling in service use, which has seriously interfered with other known valved tank closures similarly injured in use.

Figure 3:
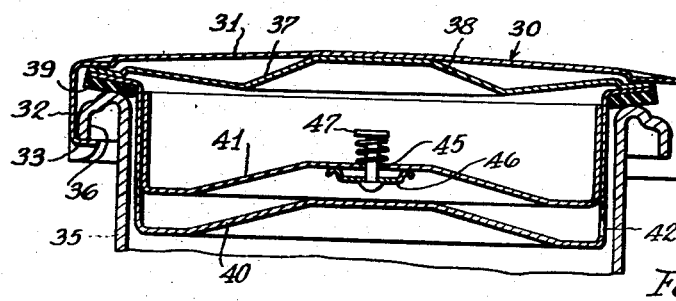
Fig. 3 is a vertical sectional view through a modified form of valved closure.

In the construction shown in Fig. 3 a somewhat similar tank closure, generally designated 30, is shown as comprised of an outer circular closure 31 having a depending annular skirt portion 32 with a plurality of inturned locking fingers 33 circumferentially spaced around the margin thereof for association with outside cams 36 on the tank filler neck 35. A spring metal member 37 is crowned, as shown, and seated centrally against the under-side of the outer closure 31, and has a free marginal portion which is under tension to seat the annular sealing gasket 39 upon the outer rim of the filler neck 35 when the closure is secured on the neck. An inverted cup-shaped member 40 is also loosely retained in the outer closure 31 above the locking fingers 33 and has a lower dome-shaped bottom wall to deflect the tank contents striking thereagainst and also to stiffen the vertical walls of the cup 40 against collapse. This member may be very economically drawn or stamped out of a selected gage sheet metal and when the closure is in fixed position on the tank neck the cup 40 will be held tightly in position against rattling between the gasket seated on the neck rim and the crowned plate 37. Vent openings 38 and 42 communicate opposite sides of the members 37 and 40, respectively, for a purpose to be described. Likewise, in this instance there is also a valve cage support 41 retained in pressed spaced relation to the bottom wall of the inner cup member 40 and over a central opening 45 therein is an inwardly opening vacuum valve 46 which is spring seated by means of a stud 47 fixed thereto. The vacuum valve is seated by a spring of selected pressure to permit withdrawal of the tank contents, and if desired may be supplemented by a second pressure relief valve as shown in Fig. 1.

This novel tank closure, it will now be apparent, is very economical to make and assemble from a few stamped parts and also has substantially all the attendant advantages of the structure in Figs. 1 and 2, with the exception of a pressure relief means, and without the mechanical fits necessary therein. The operation of this closure is as follows: Negative pressures in the tank 35 are in communication with the underside of vacuum valve 46 by means of vent opening 42, and with the atmosphere through vent opening 38 in the crowned spring member 37. Under a condtion of negative tank pressure the vacuum relief valve will be drawn inward off its seat and pressure balance effected to permit fluid withdrawal.

From the foregoing disclosures it will be apparent there have been described novel and economical tank closures accomplishing, among other things, the objects and advantages of the invention first enumerated, although it is not intended to be limited to the specific embodiments of the device shown, which are merely for purposes of illustration and anyone skilled in the art may make formal modifications or equivalents of the structure disclosed without departing from the spirit and substance of the invention as defined by the scope of the following claims.

What I claim is:

1. In a fuel tank closure, a circular closure adapted to be applied to the tank neck, an inner cup-shaped member fixed within and above the lower margin of the outer closure and in conjunction therewith defining a hollow chamber therebetween, valve retaining means comprising a circlar centrally apertured cup-shaped member retained in fixed position by said inner cup member in spaced relation to the bottom thereof and defining a second chamber therebetween, valve means seated around the periphery of said circular central aperture of the cup shaped member for regulation of fluid flow therethrough, spring-pressed means seated against the underside of the outer closure and the valve means controlling opening pressures thereof, a second spring-pressed valve means seated centrally in said first valve and opening oppositely thereto into said second chamber, plural vent means in said inner cup member communicating the tank contents with said second chamber and through the valve means to the first chamber with the atmosphere, and said spring-pressed valve means supported by the valve-retaining member and the inner cup member within and above the lower marginal outline of the outer closure being completely enveloped thereby is protected from extrinsic knocks and foreign matter in use.

2. In a fuel tank closure, a circular closure adapted to be applied to the tank neck, an inner cup-shaped member fixed within and above the lower margins of the outer closure and in conjunction therewith defining a hollow chamber therebetween, valve retaining means comprising a circular centrally apertured cup-shaped member retained in fixed position by said inner cup member in spaced relation to the bottom thereof and defining a second chamber therebetween, valve means seated around the periphery of said circular central aperture of the cup-shaped member for regulation of fluid flow therethrough, spring-pressed means seated against the underside of the outer closure and the valve means controlling opening pressures thereof, said valve means constructed and arranged as to be centralized and freely moveable within the aperture of said valve-retaining member under the influence of the valve spring, a second spring-pressed valve means seated centrally in said first valve and opening oppositely thereto into said second chamber, plural vent means in said inner cup member communicating the tank contents with said second chamber and through the valve means to the first chamber with the atmosphere, and said spring-pressed valve means supported by the valve-retaining member and the inner cup member within and above the lower marginal outline of the outer closure being completely enveloped thereby is protected from extrinsic knocks and foreign matter in use.

PAUL D. NEWTON.